Patented Jan. 4, 1938

2,104,692

UNITED STATES PATENT OFFICE 2,104,692

CORK COMPOSITION AND METHOD OF MANUFACTURE

Giles B. Cooke and Scott I. Wilbur, Baltimore, Md., assignors to Crown Cork & Seal Company, Inc., Baltimore, Md., a corporation of New York No Drawing. Application May 14, 1935, Serial No. 21,482

9 Claims. (Cl. 106—22)

The present invention relates to an improved cork composition and binder therefor. By "cork composition" is meant a body in which the cork predominates by volume composed of cork particles united together by a binder.

The present cork composition is characterized by the fact that gaskets, sealing liners and other articles formed therefrom possess flexibility, resilience, high tensile strength and resistance to the action of acids, solvent oils, water and a wide range of temperature and humidity changes without appreciable changes in dimension (shrinkage or expansion).

Particularly the present invention relates to a stable cork composition, i. e., one which is substantially free from any moisture and which moreover, is highly resistant to moisture absorption. Heretofore, cork composition has exhibited a tendency to shrink objectionably where the binder contained an appreciable amount of water, this contraction taking place when the water was driven off, for example by evaporation, heat or other conditions to which the material was subjected. Likewise, some cork compositions exhibit a moisture absorbent quality whereby the presence of absorbed moisture in appreciable amount will cause objectionable expansion of the cork body; and again, when this absorbed moisture is removed or driven off, the cork composition will appreciably contract.

This undesirable condition of expansion and contraction has been a problem where the cork composition includes a binder of glue gel, i. e., a glue with a polyhydric alcohol of the glycerine type acting as a solvent and plasticizer. Because of the hygroscopic influence of the polyhydric alcohol, it has not been possible to produce a satisfactory stable cork composition free of dimensional change.

In the case of a resin binder using a polyhydric alcohol solvent plasticizer the hygroscopic function of the polyhydric alcohol is exhibited to a lesser extent, but as distinguished from the flexible and resilient gel binder, the resin binder is characterized by unsatisfactory hardness. The presence of a greater amount of polyhydric alcohol would weaken the resin binder and result in a more pronounced hygroscopicity. Mixtures consisting of resin and glue gel in some cases, while free from objectionable hygroscopicity, exhibit a tendency to brittlize as where the effect of the resin is predominant. On the other hand, where the glue gel exerts the dominant effect and the binder mixture is relatively softer, increased hygroscopicity is observed.

The present invention provides for the use of a binder having an adhesive base consisting of a glue gel, or a resin, or a mixture thereof, wherein the hygroscopic effect of solvent-plasticizer is reduced to a satisfactory minimum. That is, the objectionable hygroscopic influence of the polyhydric alcohol is overcome while at the same time, and particularly where a resin is used, the binder is rendered soft, resilient, flexible, tenacious and resistive. In other words, the normal tendency of the cork composition, having a binder containing hygroscopic agents, to expand and contract due to the influence of contained moisture or absorbed moisture, is substantially eliminated, without, however, interfering with the plasticizing function of the normally hygroscopic polyhydric alcohols.

It is the purpose of the present invention, therefore, to provide a cork composition in which there is no appreciable amount of water or moisture present so as to eliminate, as far as possible, objectionable dimensional changes whether expansion or shrinkage; also the cork composition of this invention is moisture resistant to the extent that it exerts no substantial hygroscopicity or absorbency for water or water vapor with the result that objectionable expansion and shrinkage of the cork composition as heretofore experienced is satisfactorily overcome.

Stated another way, while it is realized that expansion and contraction in cork compositions cannot be entirely eliminated, the present invention improves the stability of the cork composition with respect to these factors through a wide range of temperature and humidity changes and the cork composition undergoes no substantial alteration of dimensions.

The binder employed in the manufacture of our cork composition preferably includes an adhesive base which may be a natural resin, such as kauri, elemi and dammar, or a synthetic resin of the phenol aldehyde type, urea aldehyde type or glycerol phthalate type, commonly called "Glyptal". Preferably, a synthetic resin is used which in its A or initial stage is fusible and soluble, and capable of being rendered infusible and insoluble by the application of heat, i. e., converted to the C stage. In fact, practically any synthetic resin may be used, or a mixture thereof with other synthetic or natural resins, e. g., a mixture of phenol formaldehyde and urea formaldehyde resins. Preferably the resin is mixed with or dissolved in a plasticizer such as one of the polyhydric alcohols, e. g., glycerine or glycol.

Instead of a resin adhesive base, the adhesive base consists of glue preferably in the form of a glue gel, i. e., glue and a polyhydric alcohol such as glycerine or the glycols. Glues of various types are used, such as gelatin glue, hide glue, coney glue, albumens and casein, and are preferably formed into a suitable gel as stated above with a polyhydric alcohol.

If desired the adhesive base may consist of latex alone and/or one or more of the adhesives above mentioned, e. g., latex and glue, latex and resin, or latex, resin and glue. If latex is used, I prefer to include a certain amount of animal and/or vegetable and/or synthetic waxes, and/or paraffins, and/or any suitable solid or liquid fatty materials, and this may be done, for example, after the manner described in the patent to Weiss 1,563,410 December 1, 1925.

A preferred adhesive base consists of a mixture of one or more of the synthetic resins, and a glue gel. The resin, glue, and cork will be combined in various proportions, e. g., one cork composition will use a binder containing a major amount of resin, another will have a binder consisting of equal parts of the resin and glue or again the binder will have the glue predominating, all according to the resiliency, flexibility, tensile strength, and resistant properties required in the final product. Of course, the proportion of cork to binder may likewise be varied to regulate the characteristics of the cork composition, it being understood that the cork will predominate by volume. In any case, the cork composition exhibits a freedom from substantial or objectionable dimensional alteration.

We also use a modifying oil capable of forming a semi-rigid solid, i. e., a gel and preferably an adhesive gel. By a modifying oil, we mean one which may be reduced to a tough, flexible, resilient, adhesive state, which is chemically resistant and particularly water and moisture resistant, and will exert and impart each of these properties to a binder of which it is a component part. This modifying action is particularly useful with a binder having for example a glue gel base, or a resin base, or a combination of the two. The modifying oil is not only non-hydroscopic, but it overcomes the heretofore objectionable shrinkage and expansion effects resulting from the hydroscopicity of such agents as glycerine and glycols which are generally used with glue gels and synthetic resin adhesives as solvents and plasticizers. Moreover, the modifying oil does not destroy the plasticizing action of such agents and, in fact, strengthens and flexibilizes the bond as well as increases its water and moisture resistance. An oil which will do this is one having an appreciable amount of unsaturated fatty acid glycerides. Typical of such an oil is tung oil, known as China-wood oil.

We employ tung oil in its polymerized state, i. e., treated at temperatures sufficient to bring about partial polymerization, but at the same time maintaining the tung oil in a free flowing state. The temperatures and periods of polymerization may be varied, e. g., 350° F. for four hours or 500° F. for one-half hour, depending upon the quantity being treated. Any other temperatures may be employed that will produce sufficient bodying or polymerization.

In place of tung oil, we may use an oil or mixtures of oils, which are normally capable or may be treated so as to be capable of assuming an adhesive semi-rigid solid or gel state. As typical of such an oil is one having present unsaturated fatty acid glycerides in amount effective for this purpose.

To the polymerized oil having a temperature of about 350° to 500° F., there is added a polymerization catalyst and/or accelerator, preferably an organic base, although an inorganic one may be used. Aromatic or aliphatic amines are preferred. For example, up to 20 per cent of an amine such as an ethanolamine is used, e. g., mono, di, or triethanolamine. This agent appears to (1) react with any free fatty acids in the China-wood oil, and (2) act as a catalyzer and/or accelerator to insure rapid polymerization of the China-wood oil to a point where it still retains a fluid state. Where an excess of amine, for example, is present, this is beneficially employed in making the binder as will be later described. Any other suitable material capable of acting as a polymerizing and/or catalytic agent is, of course, used.

We also use a gelling agent, preferably an acid anhydride. Any acid anhydride capable of forming a resinous body with a polyhydric alcohol such as glycerine or glycols, may be employed, e. g., an anhydride of a saturated or unsaturated acid of the aromatic or aliphatic series, namely phthalic, succinic, maleic or malic anhydride.

By gelling agent, we mean a material capable of (1) converting the treated oil from its fluid state to a tough, adhesive, elastic, solid or gel condition, e. g., semi-rigid state and/or (2) catalyzing the setting of the resin to its final state.

We preferably prepare a maleic anhydride solution usually by melting maleic anhydride crystals and adding thereto a suitable amount of polyhydric alcohol, for example glycerine or glycols.

Where the resin containing free unreacted aldehyde is employed it is not ordinarily necessary to use any additional insolubilizing agent for the glue gel if a mixture of resin and glue gel are present in the binder. In some cases, a small or required percentage of aldehyde may be added to the binder to insure the complete condensation of all the phenol or urea present and insolubilizing of the glue. Instead of aldehyde, hexamethylene-tetramine can be employed for tanning the glue.

Also, in some cases, to improve the appearance of the cork composition, a small percentage of a suitable bleaching agent, e. g., oxalic acid, is added to the binder, and this likewise will accelerate the setting of the resin.

We also employ, in some cases, with any of the binders described herein a suitable amount of vegetable and/or animal and/or synthetic waxes, and/or paraffins, and/or any liquid or solid fatty materials.

In making up a composition, suitable proportions of the bodied tung oil treated with a base, such as triethanolamine, a glue gel, namely glue and polyhydric alcohol, a synthetic resin in a polyhydric alcohol, and maleic anhydride in a polyhydric alcohol, with or without additional aldehyde and/or oxalic acid as required are mixed together, and the temperature of the mixture is maintained at about 225° F. or below in order to prevent any premature setting or gelling of the binder. The presence of hygroscopic agents such as polyhydric alcohols does not exert in the binder and in the final cork composition product any substantial hygroscopicity, but does render the cork composition flexible by softening the cork and plasticizing the binder. This absence of substantial or objectionable hygroscopicity is due to the fact that the polyhydric alcohols are colloidally bound in the binder medium and consequently cannot exert their normal hygroscopic function. By "substantial" or "objectionable" hygroscopicity, we mean that the deliquescent agents are available in the binder and cork composition to freely exercise their normal affinity for water or water vapor. This results in water and moisture absorption in the cork composition with consequent expansion thereof beyond a reasonable tolerance. When this water and moisture is lost by evaporation or driven off by heating the cork composition contracts or shrinks.

Thus explaining further, a gasket is (1) cut to proper dimensions from the cork composition which has been expanded or swelled due to water or moisture absorption, or (2) the gasket after cutting becomes expanded or swelled by water or moisture absorption. In the normal storage, shipment or use of the gasket, this water or moisture frequently evaporates or is driven off with consequent shrinkage or contraction, thereby destroying the fit of the gasket. This is clear in that often the bolt holes will not properly register with the bolts or the gasket opening will not properly line up with the port to be sealed. The importance then of preventing the exercise of deliquescent action and movement of the cork whereby dimensional change takes place will be appreciated.

The mixture in fluid state is thereafter, in suitable apparatus, thoroughly mixed with the granulated cork of any desired particle size, preferably by spraying or distributing the binder mixture in controlled amounts to the body mass of cork while the latter is undergoing vigorous agitation in a mixing chamber and at substantially room temperature. In this manner, all of the cork particles become thoroughly coated with a substantially continuous film of the binder. The binder coated cork particles are rapidly withdrawn from the mixing chamber and subjected to a suitable air conditioned cooling chamber which acts to retard any premature setting of the binder composition and renders the surface film non-tacky, i. e., free of stickiness. In this manner, the binder coated cork particles are provided with a non-tacky continuous surface film of thermoplastic binder thereon, and retain their free and independent nature as distinguished from an agglomerate, or lumpy mass. The coated cork particles may be stored, preferably in a cool place, or used immediately.

A waxy or fatty body is sometimes employed as described above, and this is preferably added in melted or softened condition to the binder coated cork in the mixing chamber and films thereof formed over the binder films on the cork particles. Thereafter the wax and binder coated cork particles are removed from the mixing chamber and treated as just described to render the wax and binder non-tacky and the cork particles retain their free and independent nature. In some cases, the waxy or fatty body may be added to the binder mixture itself and this mixture is then coated on the cork particles; or the cork particles are given a coating with such a binder containing wax and then given a subsequent wax coating as described.

When it is desired to form a block, sheet, rod, or other article of varying size and shape, the binder coated cork particles are (1) compressed into a suitable mold, (2) extruded continuously or intermittently through a tube, die, or other orifice, or (3) sheeted by suitable apparatus into continuous sheets or strips, or sheets or strips of desired length, and subjected to heat as by passing the mold through an oven at a temperature of about 240° F., or heating the extrusion or sheeting apparatus. In the case of the extrusion process, for example, the wax acts as a lubricating medium as where cork composition rods or cylinders are formed in a continuous or intermittent process. Such rods are usually sliced to form cushion liner sealing discs for caps, e. g., of the crown, lug, screw, pryoff and snap-on type.

In each case, the heating will be at a temperature sufficient to render the thermoplastic film tacky and adhesive and will continue for a sufficient time to cause (1) the resin which has remained substantially in an initial stage to toughen and assume a final stage or set condition, (2) the glue present to be tanned to an insolubilized state, and (3) the China-wood oil to become solidified, i. e., form a semi-rigid adhesive body or gel. Stated another way, the thermoplastic film is softened and then converted into a final stable adhesive bond.

The presence of the maleic anhydride or gelling agent in the binder appears during the heat treatment to (1) react with the polymerized oil and reaction product of the fatty acids and amine to render the tung oil a solid polymer having tough elastic and adhesive characteristics, (2) accelerate the conversion of the resin to the final stage, (3) react with any excess amine which is present in the oil to form a resinous adhesive body, and (4) react with polyhydric alcohols to form a resinous adhesive material.

During the oven, extrusion or sheeting treatment the condensation of the resin in completed, which reaction as stated is accelerated by the maleic anhydride; also, the glue is tanned by the formaldehyde either present in the resin or added to the binder.

It appears that these actions mentioned above of the maleic anhydride with any excess amine or with a polyhydric alcohol such as glycerine or the glycols, forms in each case a resinous mass or binder enhancing the flexibility, resilience and toughness of the bond produced by the adhesive base and the polymerized tung oil.

The polymerized tung oil in final gelled state acts as an adhesive to increase the strength and durability of the binder, modifies the horny nature of the converted resin, plasticizes the binder, and particularly renders the binder water and moisture resistant and reduces substantially the hydroscopicity of the binder.

Where the composition omits the resin, the oil exerts and imparts similar properties to the binder, particularly reducing the hydroscopicity of glue gel and enhancing its strength and durability.

Upon removal from the oven, the mold containing the cork block or other article is subjected to cooling for a suitable period, whereby over-baking is prevented, whence it may be easily removed from the mold and is ready for use. Similarly, the cork composition is ready for use after the heat treatment in the extrusion or sheeting apparatus.

Where latex is used in the binder as the adhesive base instead of a resin or gel base, the waxy or fatty body is incorporated therewith as described in the said Weiss patent to form the binder. Also, the cork particles may be coated with a latex adhesive or a latex adhesive containing a waxy or fatty body and thereafter the coated particles are provided with a film of the waxy or fatty body as described above. Similar procedure will be followed where the latex is included in a binder comprising a glue gel or a resin or a mixture thereof.

In some cases, where latex is used, suitable vulcanizing and accelerating agents are used as understood in the art.

In manufacturing a cork composition including any of the several latex containing binders, the procedure above outlined is followed.

As one example of a latex containing binder, we use a mix of 60 per cent aqueous latex solution having a stabilizing colloid such as casein, with glycerine, and introduce this mixture into a glue gel. There is then added the bodied tung oil treated as above described and mixed to form the binder. Thereafter, the cork particles are coated with this binder in the manner set forth and the particles having a film thereon are then treated with the gelling agent followed, if desired, by treatment with a waxy or fatty body or latex containing such waxy or fatty material. The glue gel need only contain a minimum percentage of polyhydric alcohol. Premature coagulation of the latex is avoided by the presence of a colloid such as casein and/or the glue gel, acting as a protective colloid.

The binder coated cork has substantially the same properties as that previously described and is treated in a similar manner to provide individual separate cork particles having a continuous, non-tacky thermoplastic surface film.

Substantially similar procedure is followed where a latex-resin adhesive base is used, or where a resin-gel-latex adhesive base is used, or where a latex adhesive base is used.

The cork particles are molded, extruded or sheeted as described, and the heat treatment will also vulcanize the latex where a vulcanizing agent is used.

Cork compositions are used for many purposes and therefore the relation of cork to binder will be varied. Thus the proportion of cork by weight to binder by weight is employed in a range from substantially 1 part cork to substantially 1 part of binder through and including substantially 6 parts cork to substantially 1 part binder. As will be appreciated, the amount of binder will vary with the particle size. That is, less binder is used where the particles are large and the total surface to be coated is less than that obtained when a similar volume of smaller particles are used. Also, the quantity or proportion of binder to cork will be controlled, depending upon the nature of the final product desired, e. g., the density of the cork composition.

The specific make-up of the cork compositions exemplified above may be as follows, employing as stated a suitable amount of a waxy or fatty body:

(1) Granulated cork _____ 100 Pounds
    Phenol formaldehyde resin (heat hardening resin in the fusible and soluble state) _____ 10
    Hide glue gel _____ 10
    Bodied tung oil treated with an amine _____ 4
    Glycerine _____ 10
    Maleic anhydride _____ 1

(2) Granulated cork _____ 50
    Glue gel _____ 15
    Tung oil treated with an amine _____ 2
    Maleic anhydride _____ ½
    Glycerine _____ 1
    Paraformaldehyde _____ ⅛

(3) Granulated cork _____ 50
    Glue gel containing 5% by weight of 60% latex _____ 15
    Tung oil treated with an amine _____ 2
    Glycerine _____ 1
    Paraformaldehyde _____ ⅛
    Maleic anhydride _____ ¼

In connection with Examples 2 and 3, the glycerine, aldehyde and anhydride may be added to the binder, but preferably are added to the binder coated cork.

The proportions just recited in the several compositions are purely illustrative and will be varied within a wide range.

Also, as set forth above, either the resin or the glue gel or the latex may be eliminated.

In some cases, all of such adhesive bases may be omitted and a suitable binder obtained in the following manner. Bodied tung oil treated with and containing an excess of an olamine, is mixed with glycerine or other polyhydric alcohol containing maleic anhydride and in which reaction of the anhydride and polyhydric alcohol has been initiated to form a liquid resinous body. The cork is mixed with this binder solution as described above and the heat treatment as set forth produces a very satisfactory binder consisting of the gelled oil and synthetic resin binder including the resinous reaction products of (1) the anhydride and polyhydric alcohol, and (2) the anhydride and the excess olamine. This binder is satisfactory for many purposes.

The cork compositions of this invention are characterized by having the chemical and physical cork properties available, i. e., the binder does not interfere with the inherent flexibility and resilience of the cork but in fact enhances the same. The product is resilient and compressible, flexible, has high tensile strength and resistance to bending strains.

Of particular importance, the cork composition is devoid of occluded moisture and is free of any substantial hygroscopic or moisture absorbent tendencies, whereby shrinkage or expansion with resultant dimensional change is for all practical purposes overcome.

The cork composition may be formed into any desired shapes or contours and the cork composition articles will have any required size. For example, sheets, blocks, and rods may be formed. Liner discs for use with caps for sealing various types of food and beverage products are also formed from this cork composition. A suitable centered facing or "center spot" may be applied to such cap cushion liner discs in the usual manner, or an overall facing may be applied to the liner. Such facings are usually of paper, metal foil, or of some film forming material such as cellulosic lacquers. Also a sheet of cellophane or other fabricated material may be applied to the cap cushion liner. These preformed facing materials are preferably united to the cork composition with a suitable adhesive. In some cases, the facing is separably associated with the liner. Where an adhesive is used it is preferred to employ a thermoplastic or heat coagulable adhesive which is applied as a coating on the contact surface of either the facing material or the liner.

The cork composition material is resistant to a wide range of temperature and humidity changes, as well as acids, solvent oils, hydrocarbon solvents such as benzene or benzine, alcohols, and water.

In addition to its use upon cushion sealing liners for bottle caps for container closures, the cork composition, by reason of its oil insolubility and heat resistance, is useful for the manufacture of gaskets and may be used as a single layer or as a laminae of any required thickness. In addition, the gasket may be embodied in a gasket structure of the type set forth in the patent to Balfe, No. 1,776,140. As will be understood, the cork composition is useful for sealing purposes generally in the gasket art.

The cork composition may also be used as a printing press blanket, with or without a suitable overlay sheet, and in this connection it is useful also as a stereotype press blanket for making type matrices.

The cork composition is furthermore sound absorbent and insulative, and is readily capable of decoration as by means of a suitable paint, lacquer, or other sprayed or spreadable coating.

It will be observed that the present invention includes (1) novel binders and process for preparing same, (2) a new granulated cork mass with the particles coated witth a non-tacky thermoplastic adhesive and process of preparing same, and (3) a cork composition body such as a sheet, disc, rod or block of granulated cork and a binder, and process of making the same.

We claim:

1. A cork composition which is substantially resistant to temperature and humidity changes comprising cork granules present in predominating amount, and a binder therefor comprising a synthetic resin, a glutinous adhesive, a polyhydric alcohol plasticizer which is hygroscopic, and a fatty drying oil in gelled condition, said gelled oil being formed by first reacting the said ungelled oil with an organic amine and then reacting this product in the presence of heat with a polycarboxylic acid anhydride.

2. A cork composition which is substantially resistant to temperature and humidity changes comprising cork granules present in predominating amount, and a binder therefor comprising a synthetic resin, a polyhydric alcohol plasticizer which is hygroscopic, and a fatty drying oil in gelled condition, said gelled oil being formed by first reacting the said ungelled oil with an organic amine and then reacting this product in the presence of heat with a polycarboxylic acid anhydride.

3. A cork composition which is substantially resistant to temperature and humidity changes comprising cork granules present in predominating amount, and a binder therefor comprising a glutinous adhesive, a polyhydric alcohol plasticizer which is hygroscopic, and a fatty drying oil in gelled condition, said gelled oil being formed by first reacting the said ungelled oil with an organic amine and then reacting this product in the presence of heat with a polycarboxylic acid anhydride.

4. A cork composition which is substantially resistant to temperature and humidity changes comprising cork granules present in predominating amount, and a binder therefor comprising a rubber adhesive, a polyhydric alcohol plasticizer which is hygroscopic, and a fatty drying oil in gelled condition, said gelled oil being formed by first reacting the said ungelled oil with an organic amine and then reacting this product in the presence of heat with a polycarboxylic acid anhydride.

5. A cork composition which is substantially resistant to temperature and humidity changes comprising cork granules present in predominating amount, and a binder therefor comprising at least one adhesive base selected from a group consisting of resinous, glutinous, and rubber adhesives, a wax, a polyhydric alcohol plasticizer which is hygroscopic, and a fatty drying oil in gelled condition, said gelled oil being formed by first reacting the said ungelled oil witth an organic amine and then reacting this product in the presence of heat with a polycarboxylic acid anhydride.

6. A cork composition which is substantially resistant to temperature and humidity changes comprising cork granules present in predominating amount, and a binder therefor comprising a fatty drying oil in gelled condition, a polyhydric alcohol plasticizer which is hygroscopic, said gelled oil being formed by first reacting the said ungelled oil with an organic amine and then reacting this product in the presence of heat with a polycarboxylic acid anhydride.

7. The method of making cork composition comprising mixing together cork granules and a binder comprising at least one adhesive base selected from a group consisting of resinous, glutinous, and rubber adhesives, a polyhydric alcohol plasticizer which is hygroscopic, an ungelled fatty drying oil which has been first reacted with an organic amine, and a polycarboxylic acid anhydride, forming the binder as a film upon the cork granules, and heating the mass to set the binder and gell the amine reacted oil to an adhesive state by reaction of said anhydride therewith.

8. The method of making cork composition comprising mixing together cork granules and a binder comprising at least one adhesive base selected from a group consisting of resinous, glutinous, and rubber adhesives, a polyhydric alcohol plasticizer which is hygroscopic, an ungelled fatty drying oil which has been first reacted with an organic amine, a wax, and a polycarboxylic acid anhydride, forming the binder as a film upon the cork granules, and heating the mass to set the binder and gell the amine reacted oil to an adhesive state by reaction of said anhydride therewith.

9. The method of making cork composition comprising mixing together cork granules and a binder comprising a fatty drying oil which has been first reacted with an organic amine, and a polycarboxylic acid anhydride, form the binder as a film upon the granules, and heating the mass to cause the anhydride to gell the amine reacted oil to an adhesive state.

GILES B. COOKE.
SCOTT I. WILBUR.